(12) United States Patent
Catovic et al.

(10) Patent No.: US 12,035,135 B2
(45) Date of Patent: Jul. 9, 2024

(54) HANDLING OF SLICES SUBJECT TO NETWORK SLICE SPECIFIC AUTHENTICATION AND AUTHORIZATION PROCEDURE

(71) Applicant: QUALCOMM Incorporated, San Diego, CA (US)

(72) Inventors: Amer Catovic, San Diego, CA (US); Suli Zhao, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/453,147

(22) Filed: Nov. 1, 2021

(65) Prior Publication Data

US 2022/0141656 A1    May 5, 2022

(51) Int. Cl.
*H04W 12/06* (2021.01)
*H04W 12/00* (2021.01)

(52) U.S. Cl.
CPC ......... *H04W 12/06* (2013.01); *H04W 12/009* (2019.01)

(58) Field of Classification Search
CPC .... H04W 12/06; H04W 12/009; H04W 48/18
See application file for complete search history.

(56) References Cited

U.S. PATENT DOCUMENTS

| 2005/0021777 | A1* | 1/2005 | Nakao | H04L 69/329 |
| | | | | 709/204 |
| 2020/0389843 | A1* | 12/2020 | Huang | H04W 8/08 |
| 2021/0120484 | A1* | 4/2021 | Thorat | H04W 28/0268 |
| 2021/0226838 | A1* | 7/2021 | Hegarty | H04L 65/1069 |
| 2021/0320850 | A1* | 10/2021 | Young | H04L 41/5012 |

OTHER PUBLICATIONS

ETSI TS 123 502 v16.6.0. "5G; Procedures for 5G Systems (5GS)." Oct. 2020. Retrieve from [https://www.etsi.org/deliver/etsi_ts/123500_123599/123502/16.06.00_60/ts_123502v160600p.pdf] on Dec. 5, 2023. (Year: 2020).*
Bagaa, Miloud; Taleb, Tarik; Gebremariam, Anteneh Atumo; Granelli, Fabrizio; Kiriha, Yoshiaki; Du, Ping; Nakao, Akihiro (2017). "End-to-end Network Slicing for 5G Mobile Networks". Journal of Information Processing. 25: 153-163. (Year: 2017).*

* cited by examiner

*Primary Examiner* — Robert B Leung
(74) *Attorney, Agent, or Firm* — Procopio, Cory, Hargreaves & Savitch

(57) ABSTRACT

Method and apparatus for blocking session management procedures for a network slice during an NSSAA procedure. The apparatus receives a network slice-specific authentication command for a network slice that is currently allowed. The apparatus determines that the network slice is being authenticated based on the received network slice-specific authentication command. The apparatus blocks session management procedures associated with the network slice based on the determination that the network slice is being authenticated.

30 Claims, 10 Drawing Sheets

HANDLING OF SLICES SUBJECT TO NETWORK SLICE SPECIFIC AUTHENTICATION AND AUTHORIZATION PROCEDURE

CROSS REFERENCE TO RELATED APPLICATION(S)

This application claims the benefit of and priority to U.S. Provisional Application Ser. No. 63/110,039, entitled "Handling of Slices Subject to Network Slice Specific Authentication and Authorization Procedure" and filed on Nov. 5, 2020, which is expressly incorporated by reference herein in its entirety.

TECHNICAL FIELD

The present disclosure relates generally to communication systems, and more particularly, to the handling of network slices subject to network slice specific authentication and authorization (NSSAA) procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may receive a network slice-specific authentication command for a network slice that is currently allowed. The apparatus may determine that the network slice is being authenticated based on the received network slice-specific authentication command. The apparatus may block session management procedures associated with the network slice based on the determination that the network slice is being authenticated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
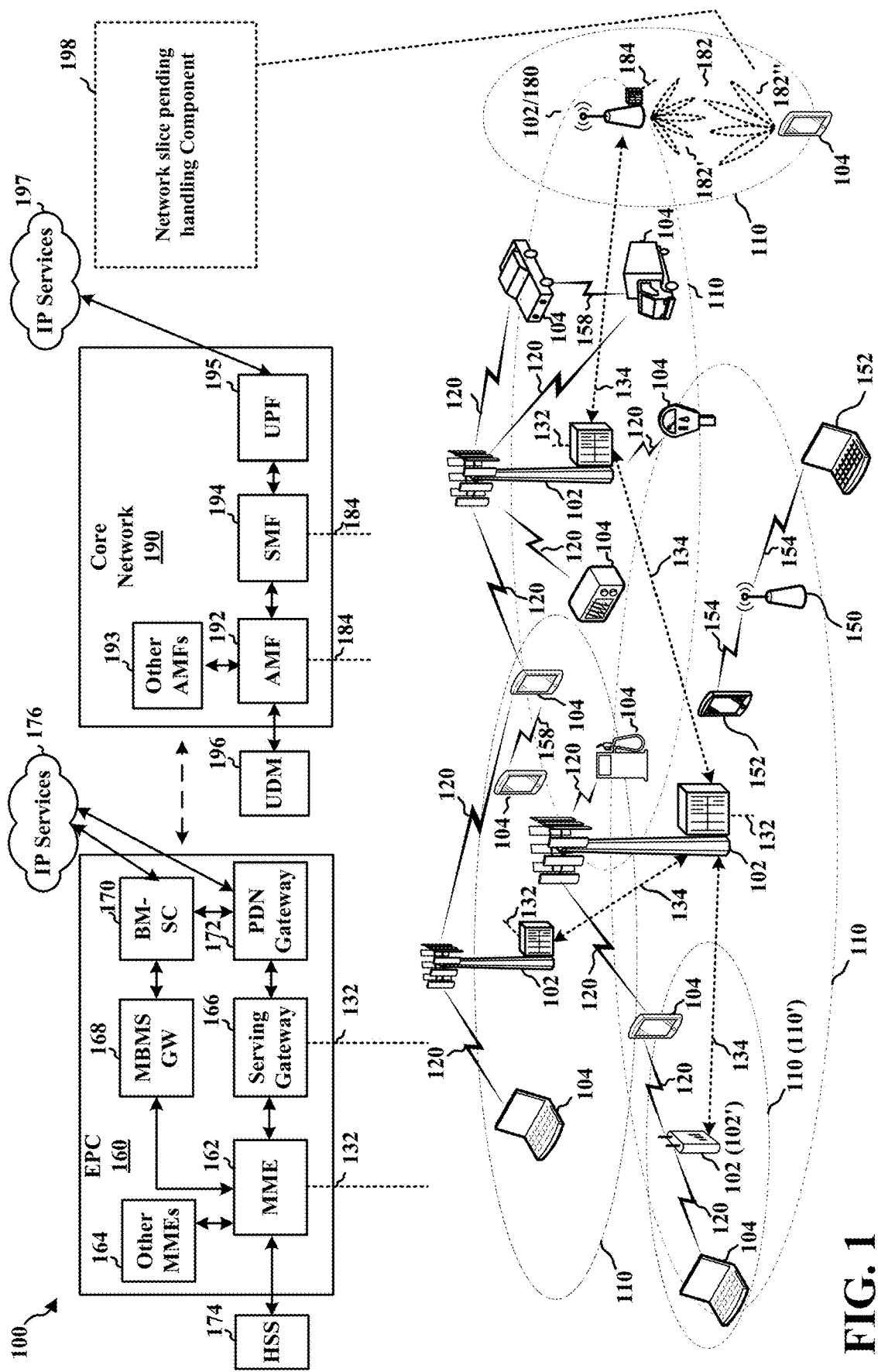
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to block session management procedures for a network slice during an NSSAA procedure. For example, the UE 104 may comprise a network slice pending handling component 198 configured to block session management procedures associated with a network slice based on a determination that the network slice is being authenticated.

Although the following description may be focused on 5G NR, the concepts described herein may be applicable to other similar areas, such as LTE, LTE-A, CDMA, GSM, and other wireless technologies.

Figure 2:
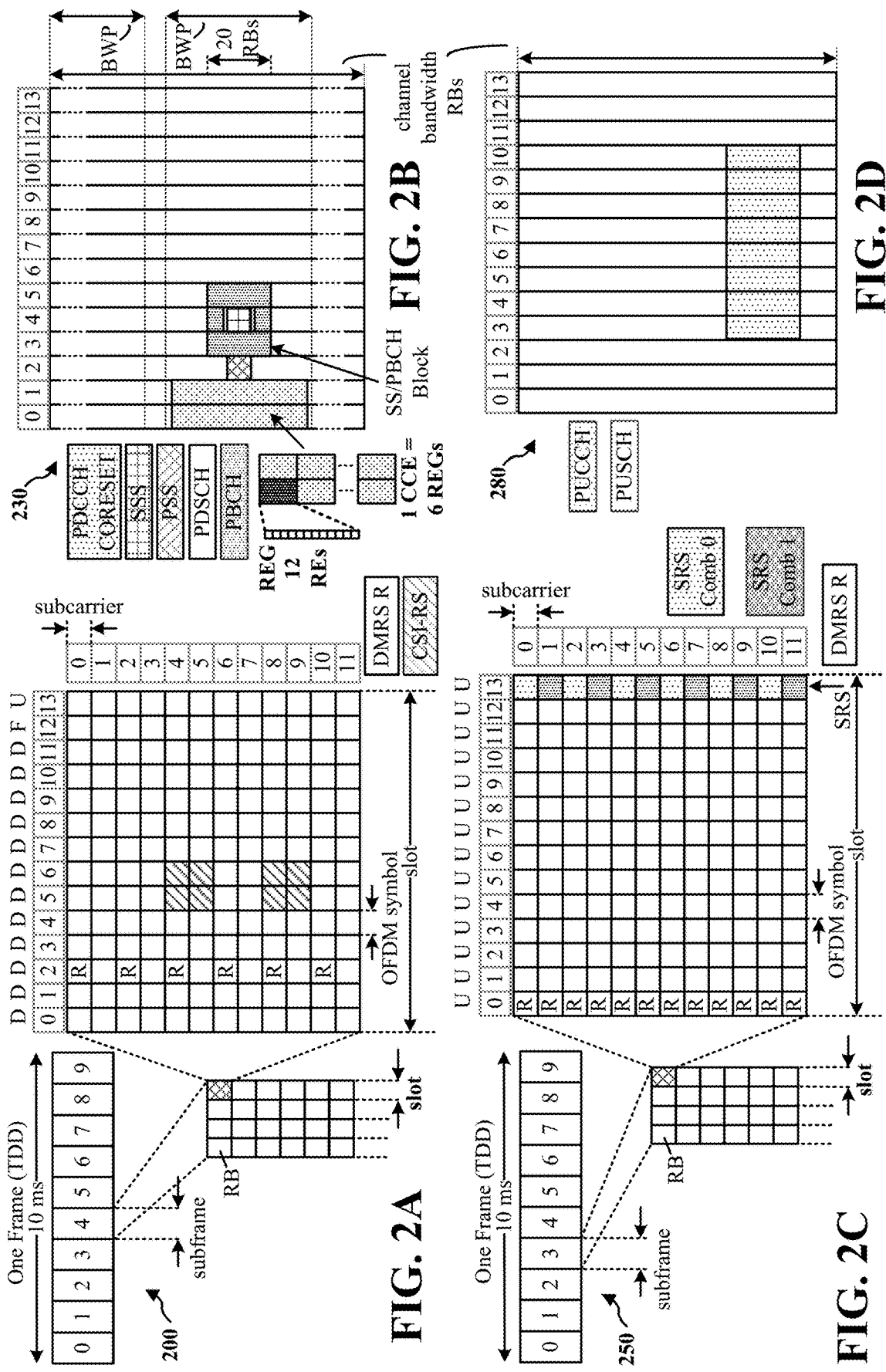
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and $2^\mu$ slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
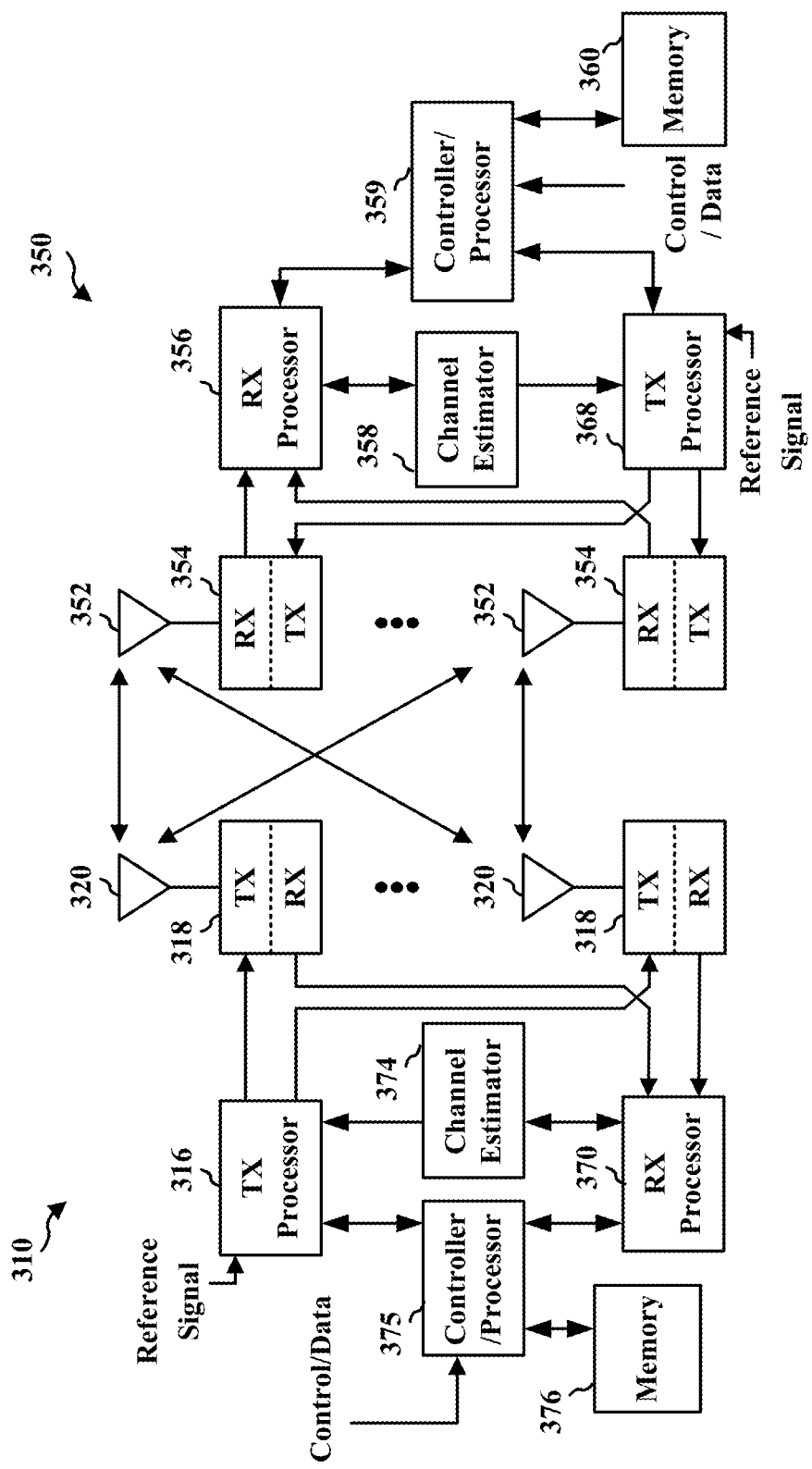
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
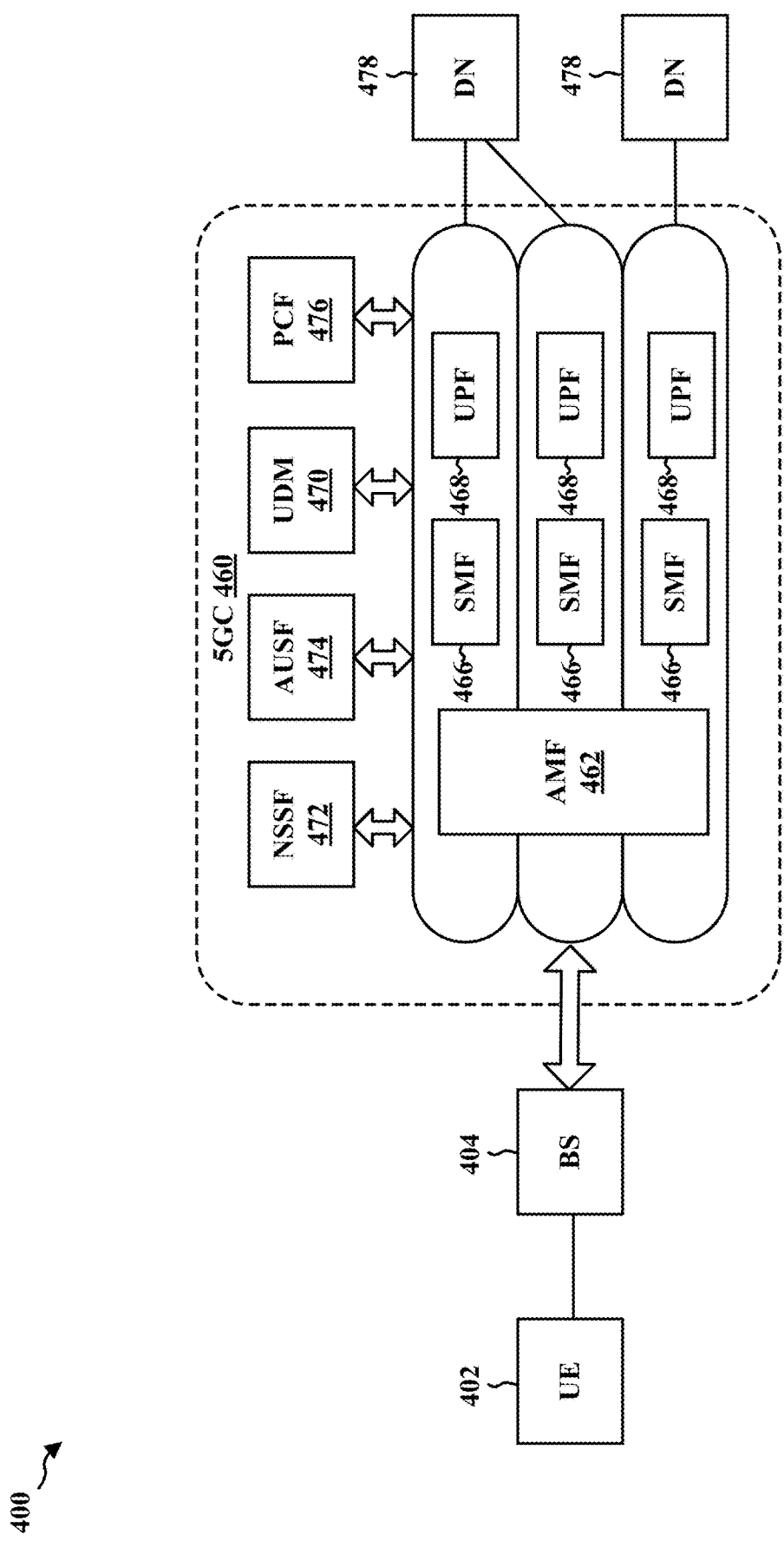
FIG. 4 is a diagram illustrating an example wireless communication system that may support network slicing in accordance with certain aspects of the disclosure.

FIG. 4 is a diagram illustrating an example wireless communication system 400 that may support network slicing in accordance with certain aspects of the disclosure. A network slice may be viewed as a logical end-to-end network that can be dynamically created. A given UE 402 may access multiple slices over the same interface via a base station 404, for example. Each slice may serve a particular service type with a set service-level agreement (SLA). A network slice may be defined within a public land mobile network (PLMN) and include the core network control plane function and user plane network function, as well as the 5GC 460. The AMF 462 instance that is serving the UE 402 may be common (or logically belongs) to all network slice instances (NSIs) that are serving the UE 402.

Identification of a network slice instance (NSI) may be performed via the Single Network Slice Selection Assistance Information (S-NSSAI) included in a PDU session request sent by the UE 402 to the network. The NSSAI may include a collection of S-NSSAIs. There may be multiple S-NSSAIs in the NSSAI sent in signaling messages between the UE 402 and the network. The S-NSSAI signaled by the UE 402 may assist the network in selecting a particular NSI. An S-NSSAI may include a Slice/Service type (SST). The SST may refer to the expected network slice behavior in terms of features and services. The SST may also include a slice differentiator (SD), which may include optional information that complements the Slice/Service type(s) and may be used to differentiate amongst multiple network slices of the same SST.

The S-NSSAI may be associated with a PLMN (e.g., PLMN ID) and have network-specific values associated with a particular S-NSSAI or standard value associated with a particular S-NSSAI. An S-NSSAI that is associated with the UE's 404 particular PLMN may be included in a PDU session request.

The NSI for a UE 402 may be triggered as part of the registration procedure by the first AMF 462 that receives the registration request (e.g., PDU session request) from the UE 402. The AMF 462 may retrieve the network slices that are associated with the UE's 404 user subscription and interacts with the network Slice Selection Function (NSSF) 472, the Authentication Server Function (AUSF) 474, the Unified Data Management (UDM) 470, and/or the Policy Control Function (PCF) 476 to select the appropriate NSI, e.g., based on particular S-NSSAIs, PLMN ID, etc. that are associated with the UE's 404 subscription and included in the PDU session request.

A PDU session may be associated with one S-NSSAI and one data network name (DNN). The establishment of a PDU session within the selected NSIs may be triggered when the AMF 462 receives a PDU session request from the UE 402. The AMF 462 may discover candidate Session Management Functions (SMF) 466 using multiple parameters including the S-NSSAI provided in the PDU session request from the UE 402. The AMF 462 may select the appropriate SMF 466 for the PDU session based on the S-NSSAI. The SMF 466 may select the User Plane Function (UPF) 468 based at least in part on the S-NSSAI included in the PDU session request. The UE 402 may begin transmitting data to the 5GC 460 after a PDU session with a Data Network (DN) 478 is established in a network slice. The S-NSSAI associated with a PDU session is provided to the 5GC 460, and policy and charging entities may apply specific NSI policies associated with the UE's 404 subscription.

In some wireless networks that support network slicing, when a UE registers with a network (e.g., PLMN) as part of the registration procedure, the UE may provide the network with a list of network slices that the UE would like to be registered with. The UE may provide the list of network slices that the UE would like to be registered with using a requested NSSAI information element (IE) within a registration request message. The network may respond with a registration accept message. The registration accept message may include the allowed NSSAI IE, which may include a list of allowed slices for the UE for which registration has been granted. The registration may imply that the network performed an authentication and authorization procedure for the UE for the slices indicated in the registration accept message. In addition, the network may also provide a pending NSSAI which may include a list of network slices for which the authentication and authorization procedure needs to be either initiated or has been initiated but has not yet been completed. A UE may not initiate any session management procedure (e.g., PDU session establishment request) for any of the S-NSSAI(s) that are in the pending NSSAI. As such, there may not be any overlap between the pending NSSAI and the allowed NSSAI, such that an NSSAI may not be on both the pending list and the allowed list.

The network may initiate an NSSAA procedure for a given S-NSSAI at any time. The network may initiate the procedure by sending a network slice-specific authentication command message to the UE including the slice identity for which the NSAA procedure is initiated. After the NSSAI procedure for the S-NSSAI is completed, the network may send a configuration update command to the UE. The configuration update command may include the result of the NSSAA procedure for the pending NSSAIs. The configuration update command may provide updated allowed NSSAI including S-NSSAI if the NSSAA procedure was successful, or may provide updated rejected NSSAI including S-NSSAI if the NSSAA procedure was not successful.

In some instances, the network may, at any point, re-perform the authentication procedure. For example, the UE subscription may have changed, or the previous authorization may have expired, such that the network may re-perform the authentication procedure for the particular slice or set of slices.

In some instances, the network may initiate an NSSAA procedure for an S-NSSAI that was not included in the pending NSSAI IE in the registration accept message. The network may not update the pending NSSAI after the registration accept message has been sent to the UE. The configuration update command message may be sent at any time, but the configuration update command message does not include a pending NSSAI IE. The network may initiate the NSSAA procedure at any time, even for slices that may not have been included in the pending NSSAI in the registration accept message. The slices that are not included in the pending NSSAI, the NSSAA procedure may be either ongoing or may be in the process of being initiated. As such, the network may inform the UE that the network has the intention to initiate an NSSAA procedure for the slices within the pending NSSAI. As soon as the registration procedure is completed, the network may initiate the NSSAA procedure, not only for the slices that were including in the pending NSSAI, but also for the slices that were included in the allowed NSSAI.

In some instances, the network may initiate NSSAA procedure for a slice that was included in the allowed NSSAI. However, once the procedure is completed, the network is not able to update the pending NSSAI outside of the registration procedure. As a result, when the NSSAI procedure for a given slice is ongoing, nothing prevents the UE from initiating a session management procedure (e.g., session establishment request) for the pending NSSAI. The UE is not supposed to initiate any session management procedures for a slice that is in the pending NSSAI. However, in this case the network initiated the NSSAA procedure for a slice that is not in the pending NSSAI, but rather for a slice that is in the allowed NSSAI. Therefore, from the UE point of view, the slice is in the allowed NSSAI. Therefore, there are no limitations as to what can be done with this slice, namely, the UE may actually initiate session management procedure for this slice. However, there is an ongoing NSSAA procedure for this slice, and the UE should not be initiating NSSAA procedure for the slice, but there is nothing that prevents the UE from doing such.

The S-NSSAI may not be within the pending NSSAI. In such instances, the NSSAA procedure may fail for the S-NSSAI. The status of the PDU session for the S-NSSAI in such instance may be undefined. As a result, the network may reject the session management request by the UE. The status of the S-NSSAI may be undefined.

Aspects presented herein provide a configuration for blocking session management procedure for a network slice during an NSSAA procedure. The configuration may prevent a UE from initiating session management procedures for a slice during an NSSAA procedure.

In some aspects, when the UE receives the network slice specific authentication command (e.g., the first portion of the NSSAA procedure) for S-NSSAI from the network, the UE may add the S-NSSAI to the pending NSSAI if the S-NSSAI is not included in the pending NSSAI. The UE may then block session management procedures for the S-NSSAI and may remove the S-NSSAI from the pending NSSAI upon receipt of the configuration update command message with the S-NSSAI included in the allowed NSSAI or the rejected NSSAI.

In some aspects, when the UE receives the network slice specific authentication command (e.g., the first portion of the NSSAA procedure) for S-NSSAI from the network, the UE may block any session management procedures associated with the S-NSSAI. The UE may remove the block on the session management procedures upon receipt of the configuration update command message with the S-NSSAI included in the allowed NSSAI or rejected NSSAI. The UE may also manage a flag, where the flag indicates that the slice identifier has a pending authentication, such that session management procedures associated with the S-NSSAI may be blocked based on the flag. The flag may further indicate that the network slice ID no longer has a pending authentication, based on the configuration update command indicating a successful authentication, such that the UE may stop blocking session management procedures for the network slice based at least in part on the flag indicating that the network slice ID no longer has the pending authentication. In some instances, the UE may stop maintaining the flag if the configuration update command indicates an unsuccessful authentication.

Figure 5:
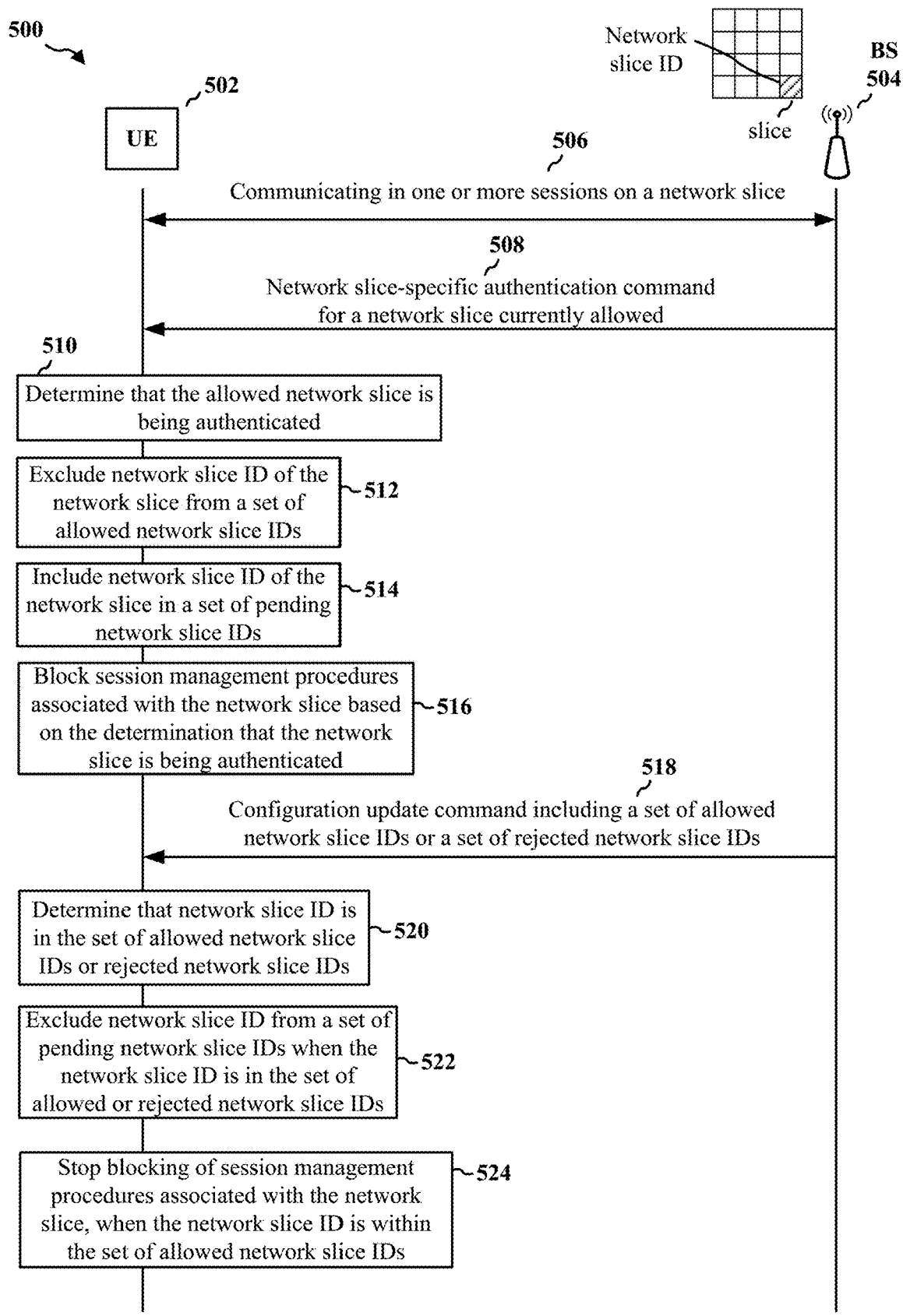
FIG. 5 is a call flow diagram of signaling between a UE and a base station.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350.

As illustrated at 506, the UE 502 and the base station 504 may be communicating with each other in one or more sessions on a network slice.

As illustrated at 508, the base station 504 may transmit a network slice-specific authentication command. The UE 502 may receive the network slice-specific authentication command from the base station 504. The network slice-specific authentication command may provide an authentication command for the network slice that may be presently allowed. In some aspects, the network slice-specific authentication command may indicate that the network slice of 506 may be re-authenticated.

As illustrated at 510, the UE 502 may determine that the network slice is being authenticated. The UE 502 may determine that the network slice is being authenticated based on the network slice-specific authentication command received from the base station.

As illustrated at 512, the UE 502 may exclude a network slice identifier (ID) of the network slice from a set of allowed network slice IDs. The UE 502 may exclude the network slice ID from the set of allowed network slice IDs based on the determination that the network slice is being authenticated.

As illustrated at 514, the UE 502 may include the network slice ID of the network slice in a set of pending network slice IDs. The UE 502 may include the network slice ID in the set of pending network slice IDs based on the determination that the network slice is being authenticated. The UE including the network slice ID of the network slice in the set of pending network slice IDs may allow for session management procedures associated with the network slice to be blocked. The network slice ID being within the set of pending network slice IDs may indicate that the network slice is being authenticated.

As illustrated at 516, the UE 502 may block session management procedure associated with the network slice. The UE 502 may block session management procedures associated with the network slice based on the determination that the network slice is being authenticated. In some aspects, the session management procedures associated with the network slice may be blocked based on at least one of the network slice ID of the network slice being excluded from the set of allowed network slice IDs or being included in the set of pending network slice IDs. In some aspects, the session management procedures associated with the network slice may be blocked for all sessions with the network slice based on the determination that the network slice is being authenticated. In some aspects, the session management procedures associated with the network slice may be blocked for a subset of sessions with the network slice based on the determination that the network slice is being authenticated. The session management procedures may include at least one of a session establishment procedure, a session modification procedure, or a session release procedure.

As illustrated at 518, the base station 504 may transmit a configuration update command to the UE 502. The UE 502 may receive the configuration update command from the base station 504. The configuration update command may include at least one of a set of allowed network slice IDs or a set of rejected network slice IDs.

As illustrated at 520, the UE 502 may determine whether the network slice ID of the network slice is in the set of allowed network slice IDs or in the set of rejected network slice IDs. The determination of the network slice ID is within the set of allowed network slice IDs may indicate that the network slice has been authenticated, which in turn may allow the UE 502 to stop blocking session management procedures associated with the network slice. The determination of the network slice ID is within the set of rejected network slice IDs may indicate that the network slice was not authenticated, such that the UE 502 may drop the session(s) associated with the network slice. In some aspects, the network slice ID may be absent in both of the set of allowed network slice IDs and the set of rejected network slice IDs, such that the network slice ID may not be authenticated. In such instances, the UE 502 may drop the session(s) associated with the network slice.

As illustrated at 522, the UE 502 may exclude the network slice ID of the network slice from a set of pending network slice IDs. The UE 502 may exclude the network slice ID from the set of pending network slice IDs when the network slice ID is in the set of allowed network slice IDs or is in the set of rejected network slice IDs. Excluding the network slice ID from the set of pending network slice IDs when the slice ID is in the set of allowed network slice IDs, may indicate that the network slice associated with the network slice ID has been authenticated. Excluding the network slice ID from the set of pending network slice IDs when the slice ID is in the set of rejected network slice IDs, may indicate that the network slice associated with the network slice ID has not been authenticated.

As illustrated at 524, the UE 502 may stop the blocking of the session management procedures for the network slice. The UE 502 may stop the blocking of the session management procedures for the network slice when the network slice ID of the network slice is included in the set of allowed network slice IDs. The UE 502 may remove the block on the session management procedures for the network slice when the network slice ID is included in the set of allowed network slice IDs due to the network slice being authenticated.

Figure 6:
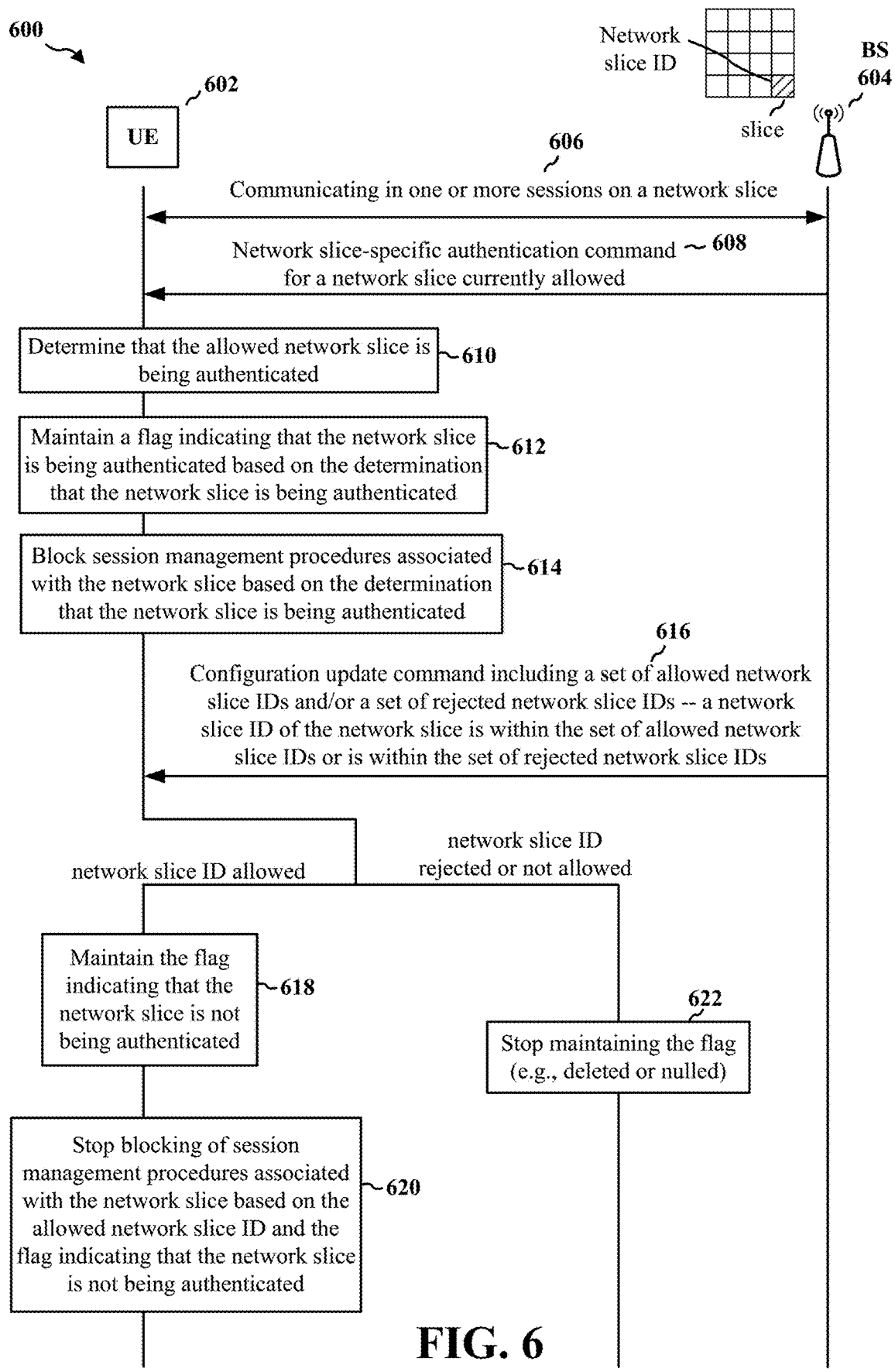
FIG. 6 is a call flow diagram of signaling between a UE and a base station.

FIG. 6 is a call flow diagram 600 of signaling between a UE 602 and a base station 604. The base station 604 may be configured to provide at least one cell. The UE 602 may be configured to communicate with the base station 604. For example, in the context of FIG. 1, the base station 604 may correspond to base station 102/180 and, accordingly, the cell may include a geographic coverage area 110 in which communication coverage is provided and/or small cell 102' having a coverage area 110'. Further, a UE 602 may correspond to at least UE 104. In another example, in the context of FIG. 3, the base station 604 may correspond to base station 310 and the UE 602 may correspond to UE 350.

As illustrated at 606, the UE 602 and the base station 604 may be communicating with each other in one or more sessions on a network slice.

As illustrated at 608, the base station 604 may transmit a network slice-specific authentication command. The UE 602 may receive the network slice-specific authentication command from the base station 604. The network slice-specific authentication command may provide an authentication command for the network slice that may be presently allowed. In some aspects, the network slice-specific authentication command may indicate that the network slice of 606 may be re-authenticated.

As illustrated at 610, the UE 602 may determine that the network slice is being authenticated. The UE 602 may determine that the network slice is being authenticated based on the network slice-specific authentication command received from the base station.

As illustrated at 612, the UE 602 may maintain a flag indicating that the network slice is being authenticated. The UE 602 may maintain the flag indicating that the network slice is being authenticated based on the determination that the network slice is being authenticated. The flag may indicate that the network slice has a pending authentication, such that the session management procedures for the network slice may be blocked by the UE 602.

As illustrated at 614, the UE 602 may block session management procedure associated with the network slice. The UE 602 may block session management procedures associated with the network slice based on the determination that the network slice is being authenticated. In some aspects, the session management procedures associated with the network slice may be blocked based on the flag for the network slice. In some aspects, the session management procedures associated with the network slice may be blocked for all sessions with the network slice based on the determination that the network slice is being authenticated. In some aspects, the session management procedures associated with the network slice may be blocked for a subset of sessions with the network slice based on the determination that the network slice is being authenticated. The session management procedures may include at least one of a session establishment procedure, a session modification procedure, or a session release procedure.

As illustrated at 616, the base station 604 may transmit a configuration update command to the UE 602. The UE 602 may receive the configuration update command from the base station 604. The configuration update command may include a set of allowed network slice IDs and/or a set of rejected network slice IDs. In some aspects, the set of allowed network slice IDs may include a network slice ID of the network slice, which may indicate that the network slice associated with the network slice ID has been authenticated.

In some aspects, the set of rejected network slice IDs may include the network slice ID of the network slice, which may indicate that the network slice associated with the network slice ID has not been authenticated.

As illustrated at 618, if the network slice ID is within the set of allowed network slice IDs, the UE 602 may maintain the flag indicating that the network slice is not being authenticated. The UE may maintain the flag indicating that the network slice is not being authenticated based on the set of allowed network slice IDs including the network slice ID of the network slice. The network slice ID being within the set of allowed network slice IDs may indicate that the network slice associated with the network slice ID has been authenticated, and is no longer in the process of being authenticated. The network slice being authenticated may allow the UE to stop blocking session management procedures associated with the network slice.

As illustrated at 620, the UE 602 may stop the blocking of the session management procedure for the network slice. The UE 602 may stop the blocking of the session management procedure for the network slice based on the network slice ID of the network slice being in the set of allowed network slice IDs and the flag indicating that the network slice is not being authenticated. The flag indicated that the network slice is not being authenticated may occur due to the network slice being properly authenticated. The network slice having been properly authenticated may result in the network slice ID being within the set of allowed network slice IDs.

As illustrated at 622, if the network slice ID of the network slice is within the set of rejected network slice IDs or is not within the set of allowed network slice IDs, the UE 602 may stop the maintaining of the flag. The UE 602 may stop the maintaining of the flag based on at least one of the network slice ID of the network slice being excluded from the set of allowed network slice IDs or included in the set of rejected network slice IDs. In some aspects, at least one of the set of allowed network slice IDs excludes the network slice ID of the network slice or the configuration update command may include the set of rejected network slice IDs in which the set of rejected network slice IDs includes the network slice ID of the network slice. The UE may stop maintaining the flag by deleting the flag or nulling the value of the flag.

Figure 7:
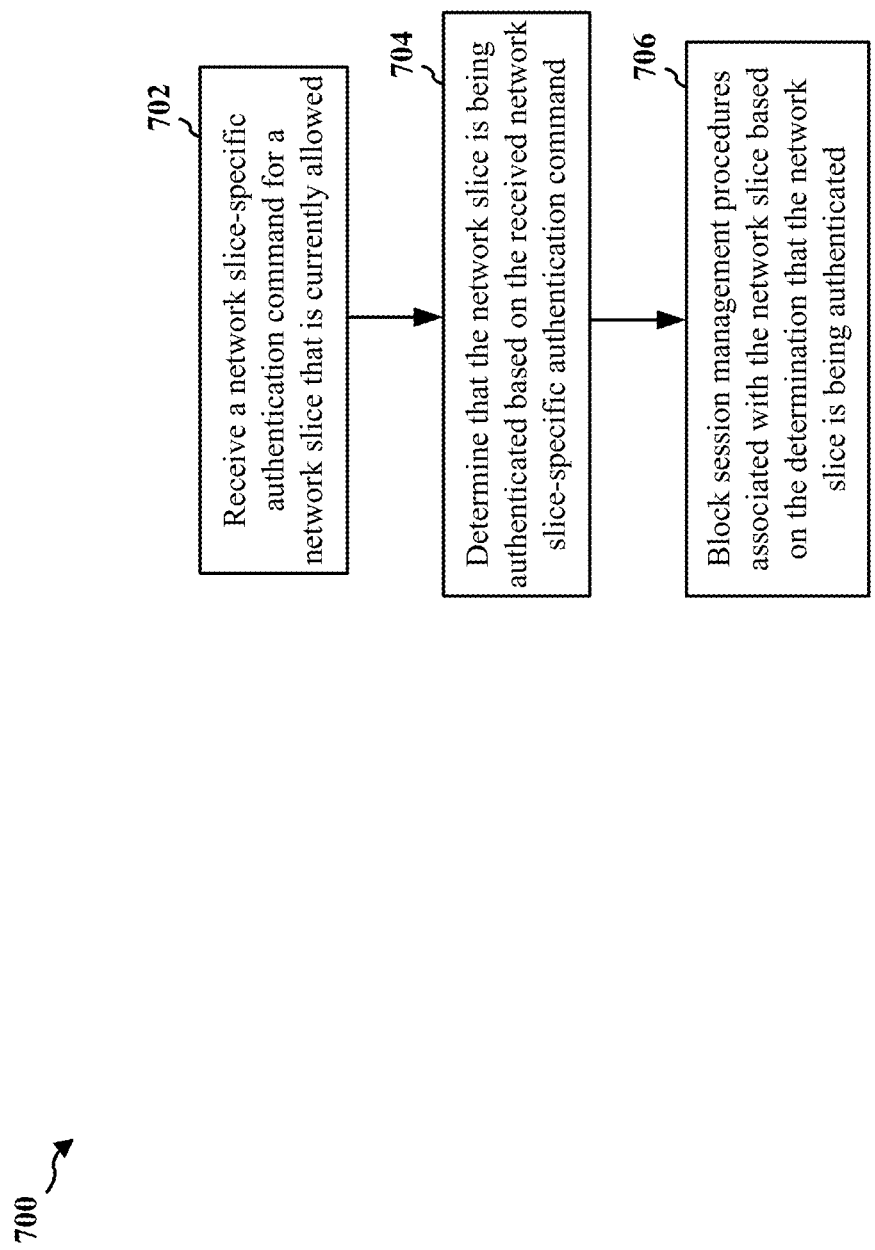
FIG. 7 is a flowchart of a method of wireless communication.

FIG. 7 is a flowchart 700 of a method of wireless communication. The method may be performed by a UE or a component of a UE (e.g., the UE 104, 402, 502, 602; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to block session management procedures for a network slice during an existing NSSAA procedure.

At 702, the UE may receive a network slice-specific authentication command for a network slice. For example, 702 may be performed by reception component 1030 of apparatus 1002. The UE may receive the network slice-specific authentication command from a base station. The network slice-specific authentication command may be for a network slice that may be currently allowed.

At 704, the UE may determine that the network slice is being authenticated. For example, 704 may be performed by network slice pending handling component 1040 of apparatus 1002. The UE may determine that the network slice is being authenticated based on the received network slice-specific authentication command.

At 706, the UE may block session management procedure associated with the network slice. For example, 706 may be performed by network slice pending handling component 1040 of apparatus 1002. The UE may block session management procedures associated with the network slice based on the determination that the network slice is being authenticated. In some aspects, the session management procedures associated with the network slice may be blocked based on at least one of the network slice ID of the network slice being excluded from the set of allowed network slice IDs or being included in the set of pending network slice IDs. In some aspects, the session management procedures associated with the network slice may be blocked for all sessions with the network slice based on the determination that the network slice is being authenticated. In some aspects, the session management procedures associated with the network slice may be blocked for a subset of sessions with the network slice based on the determination that the network slice is being authenticated. In some aspects, the session management procedures may include a session establishment procedure, a session modification procedure, or a session release procedure.

Figure 8:
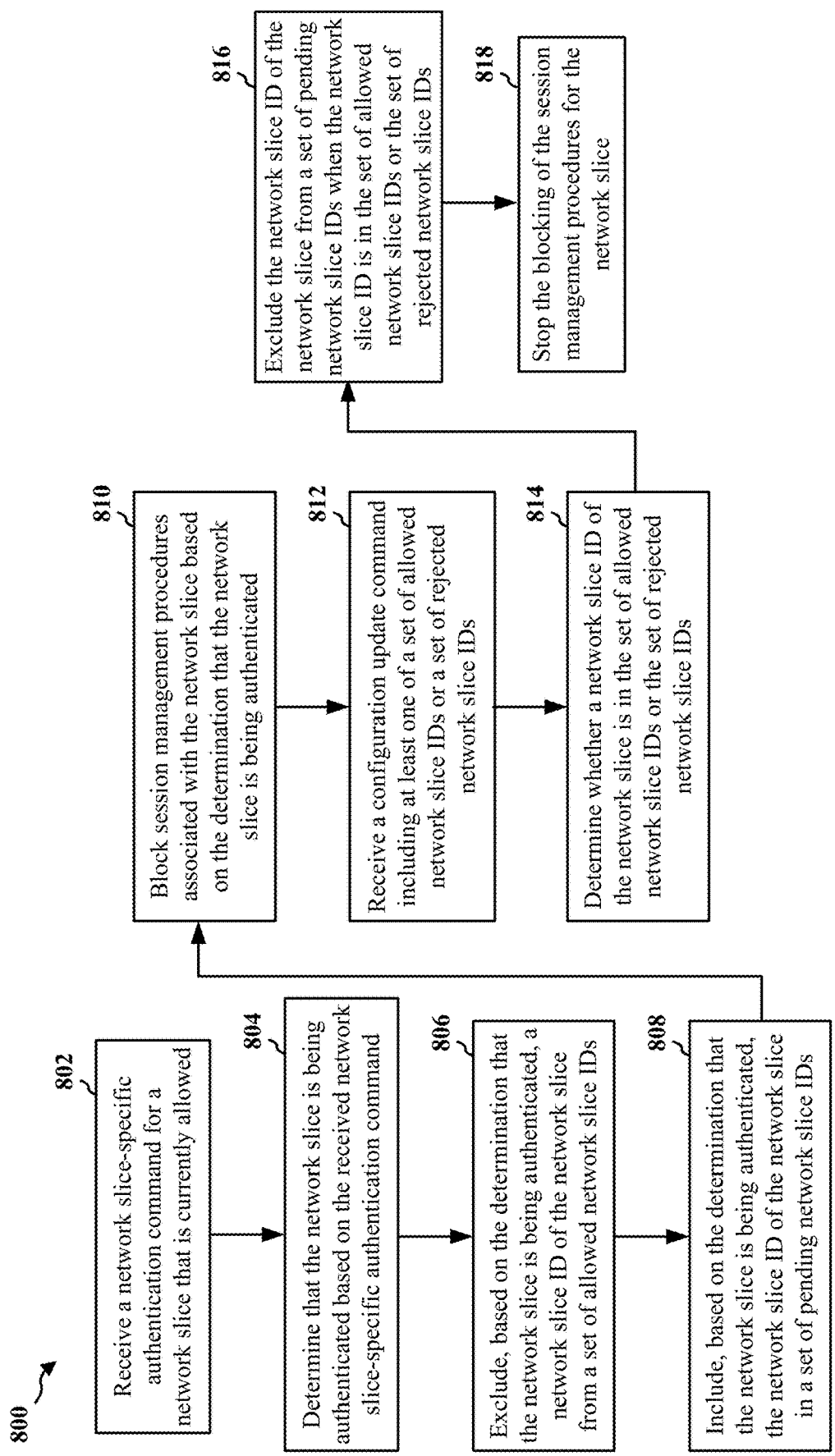
FIG. 8 is a flowchart of a method of wireless communication.

FIG. 8 is a flowchart 800 of a method of wireless communication. The method may be performed by a UE or a component of a UE (e.g., the UE 104, 402, 502, 602; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to block session management procedures for a network slice during an existing NSSAA procedure.

At 802, the UE may receive a network slice-specific authentication command for a network slice. For example, 802 may be performed by reception component 1030 of apparatus 1002. The UE may receive the network slice-specific authentication command from a base station. The network slice-specific authentication command may be for a network slice that may be currently allowed.

At 804, the UE may determine that the network slice is being authenticated. For example, 804 may be performed by network slice pending handling component 1040 of apparatus 1002. The UE may determine that the network slice is being authenticated based on the received network slice-specific authentication command.

At 806, the UE may exclude a network slice ID of the network slice from a set of allowed network slice IDs. For example, 806 may be performed by network slice pending handling component 1040 of apparatus 1002. The UE may exclude the network slice ID from the set of allowed network slice IDs based on the determination that the network slice is being authenticated.

At 808, the UE may include the network slice ID of the network slice in a set of pending network slice IDs. For example, 808 may be performed by network slice pending handling component 1040 of apparatus 1002. The UE may include the network slice ID in the set of pending network slice IDs based on the determination that the network slice is being authenticated.

At 810, the UE may block session management procedure associated with the network slice. For example, 810 may be performed by network slice pending handling component 1040 of apparatus 1002. The UE may block session management procedures associated with the network slice based on the determination that the network slice is being authenticated. In some aspects, the session management procedures associated with the network slice may be blocked based on at least one of the network slice ID of the network slice being excluded from the set of allowed network slice IDs or being included in the set of pending network slice IDs. In some aspects, the session management procedures associated with the network slice may be blocked for all sessions with the network slice based on the determination that the network slice is being authenticated. In some aspects, the session management procedures associated with the network slice may be blocked for a subset of sessions with the network slice based on the determination that the network slice is being authenticated. In some aspects, the session management procedures may include a session establishment procedure, a session modification procedure, or a session release procedure.

At 812, the UE may receive a configuration update command. For example, 812 may be performed by reception component 1030 of apparatus 1002. The UE may receive the configuration update command from a base station. The configuration update command may include at least one of a set of allowed network slice IDs or a set of rejected network slice IDs.

At 814, the UE may determine whether the network slice ID of the network slice is in the set of allowed network slice IDs or in the set of rejected network slice IDs. For example, 814 may be performed by network slice pending handling component 1040 of apparatus 1002.

At 816, the UE may exclude the network slice ID of the network slice from a set of pending network slice IDs. For example, 816 may be performed by network slice pending handling component 1040 of apparatus 1002. The UE may exclude the network slice ID from the set of pending network slice IDs when the network slice ID is in the set of allowed network slice IDs or is in the set of rejected network slice IDs.

At 818, the UE may stop the blocking of the session management procedures for the network slice. For example, 818 may be performed by network slice pending handling component 1040 of apparatus 1002. The UE may stop the blocking of the session management procedures for the network slice when the network slice ID of the network slice is included in the set of allowed network slice IDs.

Figure 9:
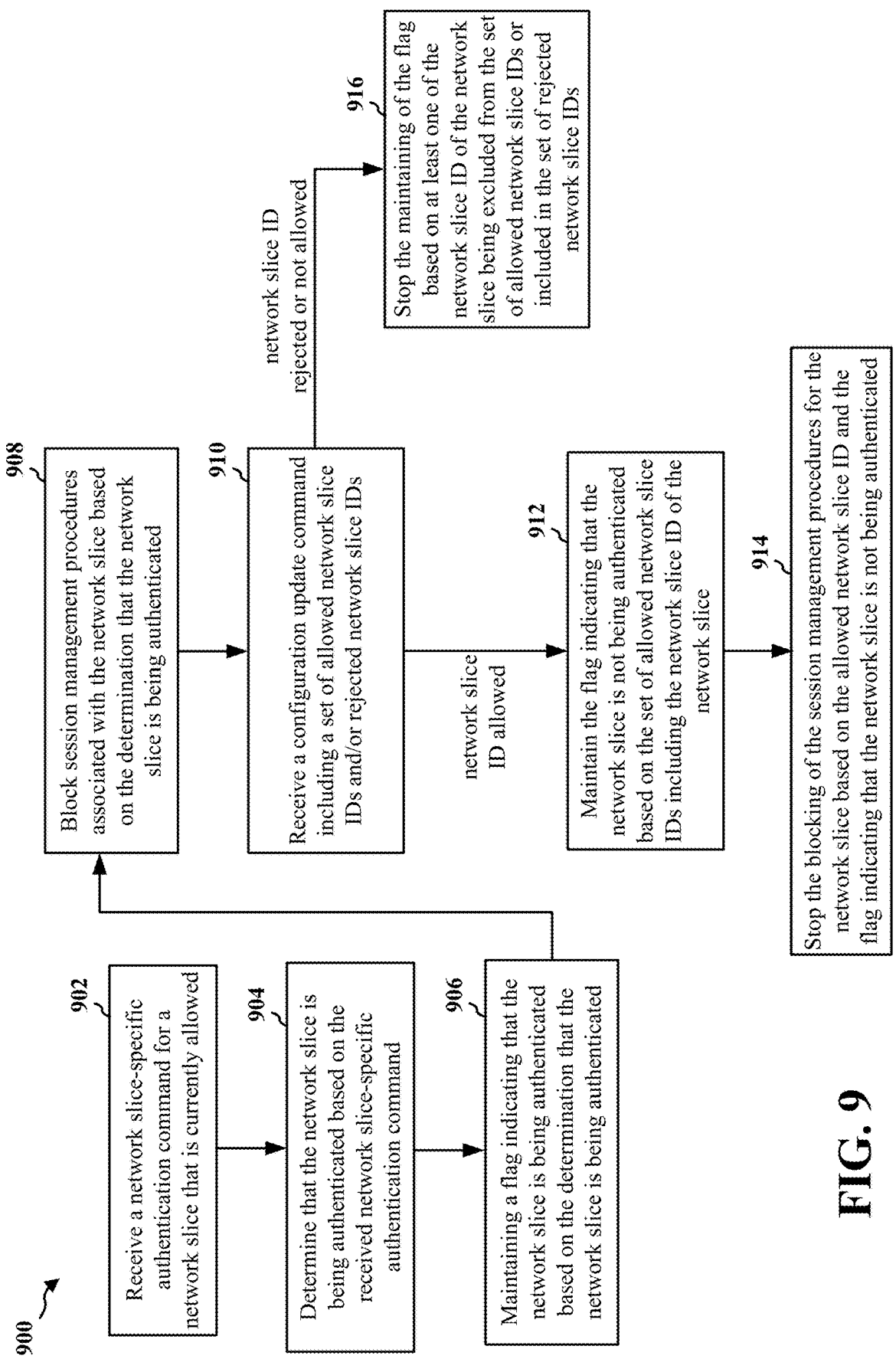
FIG. 9 is a flowchart of a method of wireless communication.

FIG. 9 is a flowchart 900 of a method of wireless communication. The method may be performed by a UE or a component of a UE (e.g., the UE 104, 402, 502, 602; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to block session management procedures for a network slice during an existing NSSAA procedure.

At 902, the UE may receive a network slice-specific authentication command for a network slice. For example, 902 may be performed by reception component 1030 of apparatus 1002. The UE may receive the network slice-specific authentication command from a base station. The network slice-specific authentication command may be for a network slice that may be currently allowed.

At 904, the UE may determine that the network slice is being authenticated. For example, 904 may be performed by network slice pending handling component 1040 of apparatus 1002. The UE may determine that the network slice is being authenticated based on the received network slice-specific authentication command.

In some aspects, for example at 906, the UE may maintain a flag indicating that the network slice is being authenticated. For example, 906 may be performed by network slice pending handling component 1040 of apparatus 1002. The UE may maintain the flag indicating that the network slice is being authenticated based on the determination that the network slice is being authenticated.

At 908, the UE may block session management procedure associated with the network slice. For example, 908 may be performed by network slice pending handling component 1040 of apparatus 1002. The UE may block session management procedures associated with the network slice based on the determination that the network slice is being authenticated. In some aspects, the session management procedures associated with the network slice are blocked based on the flag for the network slice. In some aspects, the session management procedures associated with the network slice may be blocked for all sessions with the network slice based on the determination that the network slice is being authenticated. In some aspects, the session management procedures associated with the network slice may be blocked for a subset of sessions with the network slice based on the determination that the network slice is being authenticated. In some aspects, the session management procedures may include at least one of a session establishment procedure, a session modification procedure, or a session release procedure.

In some aspects, for example at 910, the UE may receive a configuration update command. For example, 910 may be performed by reception component 1030 of apparatus 1002. The UE may receive the configuration update command from a base station. The configuration update command may include a set of allowed network slice IDs and/or a set of rejected network slice IDs. In some aspects, the set of allowed network slice IDs may include a network slice ID of the network slice. In some aspects, the set of rejected network slice IDs may include the network slice ID of the network slice.

In some aspects, for example at 912, if the network slice ID of the network slice is within the set of allowed network slice IDs, the UE may maintain the flag indicating that the network slice is not being authenticated. For example, 912 may be performed by network slice pending handling component 1040 of apparatus 1002. The UE may maintain the flag indicating that the network slice is not being authenticated based on the set of allowed network slice IDs including the network slice ID of the network slice.

In some aspects, for example at 914, the UE may stop the blocking of the session management procedure for the network slice. For example, 914 may be performed by network slice pending handling component 1040 of apparatus 1002. The UE may stop the blocking of the session management procedure for the network slice based on the network slice ID of the network slice being in the set of allowed network slice IDs and the flag indicating that the network slice is not being authenticated.

In some aspects, for example at 916, if the network slice ID of the network slice is within the set of rejected network slice IDs or is not within the set of allowed network slice IDs, the UE may stop the maintaining of the flag. For example, 916 may be performed by network slice pending handling component 1040 of apparatus 1002. The UE may stop the maintaining of the flag based on at least one of the network slice ID of the network slice being excluded from the set of allowed network slice IDs or included in the set of rejected network slice IDs. In some aspects, at least one of the set of allowed network slice IDs excludes the network slice ID of the network slice or the configuration update command includes a set of rejected network slice IDs in which the set of rejected network slice IDs includes the network slice ID of the network slice.

Figure 10:
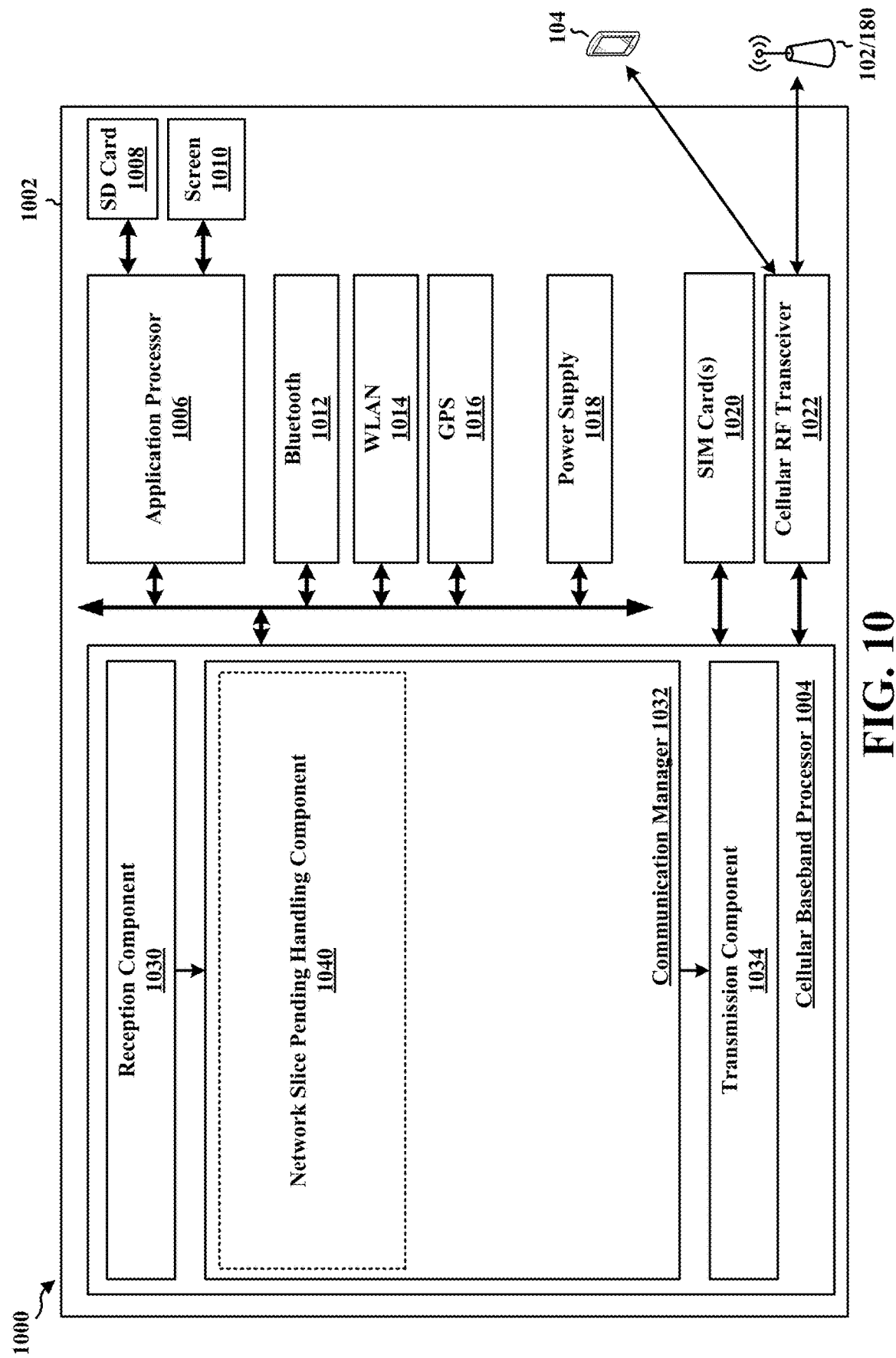
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The reception component 1030 may be configured to receive a network slice-specific authentication command for a network slice, e.g., as described in connection with 702 of FIG. 7, 802 of FIG. 8, or 902 of FIG. 9. The communication manager 1032 includes a network slice pending handling component 1040 that receives input in the form of the network slice-specific authentication command from the reception component 1030 and is configured to determine that the network slice is being authenticated, e.g., as described in connection with 704 of FIG. 7, 804 of FIG. 8, or 904 of FIG. 9. The network slice pending handling component 1040 may be configured to exclude a network slice ID of the network slice from a set of allowed network slice IDs, e.g., as described in connection with 806 of FIG. 8. The network slice pending handling component 1040 may be configured to include the network slice ID of the network slice in a set of pending network slice IDs, e.g., as described in connection with 808 of FIG. 8. The network slice pending handling component 1040 may be configured to block session management procedure associated with the network slice, e.g., as described in connection with 706 of FIG. 7, 810 of FIG. 8, 908 of FIG. 9. The reception component 1030 may be configured to receive a configuration update command, e.g., as described in connection with 812 of FIG. 8 or 910 of FIG. 9. The network slice pending handling component 1040 may be configured to determine whether the network slice ID of the network slice is in the set of allowed network slice IDs or in the set of rejected network slice IDs, e.g., as described in connection with 814 of FIG. 8. The network slice pending handling component 1040 may be configured to exclude the network slice ID of the network slice from a set of pending network slice IDs, e.g., as described in connection with 816 of FIG. 8. The network slice pending handling component 1040 may be configured to stop the blocking of the session management procedures for the network slice, e.g., as described in connection with 818 of FIG. 8 or 914 of FIG. 9. The network slice pending handling component 1040 may be configured to maintain a flag indicating that the network slice is being authenticated, e.g., as described in connection with 906 of FIG. 9. The network slice pending handling component 1040 may be configured to maintain the flag indicating that the network slice is not being authenticated, e.g., as described in connection with 912 of FIG. 9. The network slice pending handling component 1040 may be configured to stop maintain the flag, e.g., as described in connection with 916 of FIG. 9.

The apparatus may include additional components that perform each of the blocks of the algorithm in the flowcharts of FIGS. 7, 8, and 9. As such, each block in the flowcharts of FIGS. 7, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving a network slice-specific authentication command for a network slice that is currently allowed. The apparatus includes means for determining that the network slice is being authenticated based on the received network slice-specific authentication command. The apparatus includes means for blocking session management procedures associated with the network slice based on the determination that the network slice is being authenticated. The apparatus further includes means for excluding, based on the determination that the network slice is being authenticated, a network slice ID of the network slice from a set of allowed network slice IDs. The apparatus further includes means for including, based on the determination that the network slice is being authenticated, the network slice ID of the network slice in a set of pending network slice IDs. The session management procedures associated with the network slice are blocked based on at least one of the network slice ID of the network slice being excluded from the set of allowed network slice IDs or being included in the set of pending network slice IDs. The apparatus further includes means for receiving a configuration update command including at least one of a set of allowed network slice IDs or a set of rejected network slice IDs. The apparatus further includes means for determining whether a network slice ID of the network slice is in the set of allowed network slice IDs or the set of rejected network slice IDs. The apparatus further includes means for excluding the network slice ID of the network slice from a set of pending network slice IDs when the network slice ID of the network slice is in the set of allowed network slice IDs or the set of rejected network slice IDs. The apparatus further includes means for stopping the blocking of the session management procedures for the network slice when the network slice ID of the network slice is included in the set of allowed network slice IDs. The apparatus further includes means for maintaining a flag indicating that the network slice is being authenticated based on the determination that the network slice is being authenticated. The session management procedures associated with the network slice are blocked based on the flag for the network slice. The apparatus further includes means for receiving a configuration update command including a set of allowed network slice IDs. The set of allowed network slice IDs including a network slice ID of the network slice. The apparatus further includes means for maintaining the flag indicating that the network slice is not being authenticated based on the set of allowed network slice IDs including the network slice ID of the network slice. The apparatus further includes means for stopping the blocking of the session management procedures for the network slice based on the network slice ID of the network slice being in the set of allowed network slice IDs and the flag indicating that the network slice is not being authenticated. The apparatus further includes means for stopping the maintaining of the flag based on at least one of the network slice ID of the network slice being excluded from the set of allowed network slice IDs or included in the set of rejected network slice IDs. At least one of the set of allowed network slice IDs excludes the network slice ID of the network slice or the configuration update command includes a set of rejected network slice IDs in which the set of rejected network slice IDs includes the network slice ID of the network slice. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a network slice-specific authentication command for a network slice that is currently allowed; determine that the network slice is being authenticated based on a received network slice-specific authentication command; and block session management procedures associated with the network slice based on a determination that the network slice is being authenticated.

Aspect 2 is the apparatus of aspect 1, further including a transceiver coupled to the at least one processor.

Aspect 3 is the apparatus of any of aspects 1 and 2, further includes that the at least one processor is further configured to: exclude, based on the determination that the network slice is being authenticated, a network slice ID of the network slice from a set of allowed network slice IDs; and include, based on the determination that the network slice is being authenticated, the network slice ID of the network slice in a set of pending network slice IDs, wherein the session management procedures associated with the network slice are blocked based on at least one of the network slice ID of the network slice being excluded from the set of allowed network slice IDs or being included in the set of pending network slice IDs.

Aspect 4 is the apparatus of any of aspects 1-3, further includes that the at least one processor is further configured to receive a configuration update command including at least one of a set of allowed network slice IDs or a set of rejected network slice IDs; determine whether a network slice ID of the network slice is in the set of allowed network slice IDs or the set of rejected network slice IDs; exclude the network slice ID of the network slice from a set of pending network slice IDs when the network slice ID of the network slice is in the set of allowed network slice IDs or the set of rejected network slice IDs; and stop the blocking of the session management procedures for the network slice when the network slice ID of the network slice is included in the set of allowed network slice IDs.

Aspect 5 is the apparatus of any of aspects 1-4, further includes that the at least one processor is further configured to maintain a flag indicating that the network slice is being authenticated based on the determination that the network slice is being authenticated, wherein the session management procedures associated with the network slice are blocked based on the flag for the network slice.

Aspect 6 is the apparatus of any of aspects 1-5, further includes that the at least one processor is further configured to receive a configuration update command including a set of allowed network slice IDs, the set of allowed network slice IDs including a network slice ID of the network slice; maintain the flag indicating that the network slice is not being authenticated based on the set of allowed network slice IDs including the network slice ID of the network slice; and stop the blocking of the session management procedures for the network slice based on the network slice ID of the network slice being in the set of allowed network slice IDs and the flag indicating that the network slice is not being authenticated.

Aspect 7 is the apparatus of any of aspects 1-6, further includes that at least one of the set of allowed network slice IDs excludes the network slice ID of the network slice or the configuration update command includes a set of rejected network slice IDs in which the set of rejected network slice IDs includes the network slice ID of the network slice, further includes that the at least one processor is further configured to stop the maintaining of the flag based on at least one of the network slice ID of the network slice being excluded from the set of allowed network slice IDs or included in the set of rejected network slice IDs.

Aspect 8 is the apparatus of any of aspects 1-7, further includes that the session management procedures associated with the network slice are blocked for all sessions with the network slice based on the determination that the network slice is being authenticated.

Aspect 9 is the apparatus of any of aspects 1-8, further includes that the session management procedures associated with the network slice are blocked for a subset of sessions with the network slice based on the determination that the network slice is being authenticated.

Aspect 10 is the apparatus of any of aspects 1-9, further includes that the session management procedures include a session establishment procedure.

Aspect 11 is the apparatus of any of aspects 1-10, further includes that the session management procedures include a session modification procedure.

Aspect 12 is the apparatus of any of aspects 1-11, further includes that the session management procedures include a session release procedure.

Aspect 13 is a method of wireless communication for implementing any of aspects 1-12.

Aspect 14 is an apparatus for wireless communication including means for implementing any of aspects 1-12.

Aspect 15 is a computer-readable medium storing computer executable code, where the code when executed by a processor causes the processor to implement any of aspects 1-12.

What is claimed is:

1. An apparatus for wireless communication at a user equipment (UE), comprising:
a memory; and
at least one processor coupled to the memory and configured to:
receive a network slice-specific authentication command for a network slice that is currently allowed;
determine that the network slice is being authenticated based on the received network slice-specific authentication command; and
block session management procedures associated with the network slice based on the determination that the network slice is being authenticated.

2. The apparatus of claim 1, further comprising a transceiver coupled to the at least one processor.

3. The apparatus of claim 1, wherein the at least one processor is further configured to:
exclude, based on the determination that the network slice is being authenticated, a network slice identifier (ID) of the network slice from a set of allowed network slice IDs; and
include, based on the determination that the network slice is being authenticated, the network slice ID of the network slice in a set of pending network slice IDs,
wherein the session management procedures associated with the network slice are blocked based on at least one of the network slice ID of the network slice being excluded from the set of allowed network slice IDs or being included in the set of pending network slice IDs.

4. The apparatus of claim 1, wherein the at least one processor is further configured to:
receive a configuration update command including at least one of a set of allowed network slice identifiers (IDs) or a set of rejected network slice IDs;
determine whether a network slice ID of the network slice is in the set of allowed network slice IDs or the set of rejected network slice IDs;
exclude the network slice ID of the network slice from a set of pending network slice IDs when the network slice ID of the network slice is in the set of allowed network slice IDs or the set of rejected network slice IDs; and
stop the blocking of the session management procedures for the network slice when the network slice ID of the network slice is included in the set of allowed network slice IDs.

5. The apparatus of claim 1, wherein the at least one processor is further configured to:
maintain a flag indicating that the network slice is being authenticated based on the determination that the network slice is being authenticated, wherein the session management procedures associated with the network slice are blocked based on the flag for the network slice.

6. The apparatus of claim 5, wherein the at least one processor is further configured to:
receive a configuration update command including a set of allowed network slice identifiers (IDs), the set of allowed network slice IDs including a network slice ID of the network slice;
maintain the flag indicating that the network slice is not being authenticated based on the set of allowed network slice IDs including the network slice ID of the network slice; and
stop the blocking of the session management procedures for the network slice based on the network slice ID of the network slice being in the set of allowed network slice IDs and the flag indicating that the network slice is not being authenticated.

7. The apparatus of claim 6, wherein at least one of the set of allowed network slice IDs excludes the network slice ID of the network slice or the configuration update command includes a set of rejected network slice IDs in which the set of rejected network slice IDs includes the network slice ID of the network slice, wherein the at least one processor is further configured to:
stop the maintaining of the flag based on at least one of the network slice ID of the network slice being excluded from the set of allowed network slice IDs or included in the set of rejected network slice IDs.

8. The apparatus of claim 1, wherein the session management procedures associated with the network slice are blocked for all sessions with the network slice based on the determination that the network slice is being authenticated.

9. The apparatus of claim 1, wherein the session management procedures associated with the network slice are blocked for a subset of sessions with the network slice based on the determination that the network slice is being authenticated.

10. The apparatus of claim 1, wherein the session management procedures include a session establishment procedure.

11. The apparatus of claim 1, wherein the session management procedures include a session modification procedure.

12. The apparatus of claim 1, wherein the session management procedures include a session release procedure.

13. A method of wireless communication of a user equipment (UE), comprising:
receiving a network slice-specific authentication command for a network slice that is currently allowed;
determining that the network slice is being authenticated based on the received network slice-specific authentication command; and
blocking session management procedures associated with the network slice based on the determination that the network slice is being authenticated.

14. The method of claim 13, further comprising:
excluding, based on the determination that the network slice is being authenticated, a network slice identifier (ID) of the network slice from a set of allowed network slice IDs; and
including, based on the determination that the network slice is being authenticated, the network slice ID of the network slice in a set of pending network slice IDs,
wherein the session management procedures associated with the network slice are blocked based on at least one of the network slice ID of the network slice being excluded from the set of allowed network slice IDs or being included in the set of pending network slice IDs.

15. The method of claim 13, further comprising:
receiving a configuration update command including at least one of a set of allowed network slice identifiers (IDs) or a set of rejected network slice IDs;
determining whether a network slice ID of the network slice is in the set of allowed network slice IDs or the set of rejected network slice IDs;
excluding the network slice ID of the network slice from a set of pending network slice IDs when the network slice ID of the network slice is in the set of allowed network slice IDs or the set of rejected network slice IDs; and stopping the blocking of the session management procedures for the network slice when the network slice ID of the network slice is included in the set of allowed network slice IDs.

16. The method of claim 13, further comprising:
maintaining a flag indicating that the network slice is being authenticated based on the determination that the network slice is being authenticated, wherein the session management procedures associated with the network slice are blocked based on the flag for the network slice.

17. The method of claim 16, further comprising:
receiving a configuration update command including a set of allowed network slice identifiers (IDs), the set of allowed network slice IDs including a network slice ID of the network slice;
maintaining the flag indicating that the network slice is not being authenticated based on the set of allowed network slice IDs including the network slice ID of the network slice; and
stopping the blocking of the session management procedures for the network slice based on the network slice ID of the network slice being in the set of allowed network slice IDs and the flag indicating that the network slice is not being authenticated.

18. The method of claim 17, wherein at least one of the set of allowed network slice IDs excludes the network slice ID of the network slice or the configuration update command includes a set of rejected network slice IDs in which the set of rejected network slice IDs includes the network slice ID of the network slice, the method further comprising:
stopping the maintaining of the flag based on at least one of the network slice ID of the network slice being excluded from the set of allowed network slice IDs or included in the set of rejected network slice IDs.

19. The method of claim 13, wherein the session management procedures associated with the network slice are blocked for all sessions with the network slice based on the determination that the network slice is being authenticated.

20. The method of claim 13, wherein the session management procedures associated with the network slice are blocked for a subset of sessions with the network slice based on the determination that the network slice is being authenticated.

21. The method of claim 13, wherein the session management procedures include a session establishment procedure.

22. The method of claim 13, wherein the session management procedures include a session modification procedure.

23. The method of claim 13, wherein the session management procedures include a session release procedure.

24. An apparatus for wireless communication at a user equipment (UE), comprising:
means for receiving a network slice-specific authentication command for a network slice that is currently allowed;
means for determining that the network slice is being authenticated based on the received network slice-specific authentication command; and
means for blocking session management procedures associated with the network slice based on the determination that the network slice is being authenticated.

25. The apparatus of claim 24, further comprising:
means for excluding, based on the determination that the network slice is being authenticated, a network slice identifier (ID) of the network slice from a set of allowed network slice IDs; and
means for including, based on the determination that the network slice is being authenticated, the network slice ID of the network slice in a set of pending network slice IDs,
wherein the session management procedures associated with the network slice are blocked based on at least one of the network slice ID of the network slice being excluded from the set of allowed network slice IDs or being included in the set of pending network slice IDs.

26. The apparatus of claim 24, further comprising:
means for receiving a configuration update command including at least one of a set of allowed network slice identifiers (IDs) or a set of rejected network slice IDs;
means for determining whether a network slice ID of the network slice is in the set of allowed network slice IDs or the set of rejected network slice IDs;
means for excluding the network slice ID of the network slice from a set of pending network slice IDs when the network slice ID of the network slice is in the set of allowed network slice IDs or the set of rejected network slice IDs; and
means for stopping the blocking of the session management procedures for the network slice when the network slice ID of the network slice is included in the set of allowed network slice IDs.

27. The apparatus of claim 24, further comprising:
means for maintaining a flag indicating that the network slice is being authenticated based on the determination that the network slice is being authenticated, wherein the session management procedures associated with the network slice are blocked based on the flag for the network slice.

28. The apparatus of claim 27, further comprising:
means for receiving a configuration update command including a set of allowed network slice identifiers (IDs), the set of allowed network slice IDs including a network slice ID of the network slice;
means for maintaining the flag indicating that the network slice is not being authenticated based on the set of allowed network slice IDs including the network slice ID of the network slice; and
means for stopping the blocking of the session management procedures for the network slice based on the network slice ID of the network slice being in the set of allowed network slice IDs and the flag indicating that the network slice is not being authenticated.

29. The apparatus of claim 28, wherein at least one of the set of allowed network slice IDs excludes the network slice ID of the network slice or the configuration update command includes a set of rejected network slice IDs in which the set of rejected network slice IDs includes the network slice ID of the network slice, further comprising:
means for stopping the maintaining of the flag based on at least one of the network slice ID of the network slice being excluded from the set of allowed network slice IDs or included in the set of rejected network slice IDs.

30. A non-transitory computer-readable medium storing computer executable code at a user equipment (UE), the code when executed by a processor causes the processor to:
receive a network slice-specific authentication command for a network slice that is currently allowed;

determine that the network slice is being authenticated based on the received network slice-specific authentication command; and block session management procedures associated with the network slice based on the determination that the network slice is being authenticated.

* * * * *